united States Patent [19]
Schmidt et al.

[11] 4,446,120
[45] May 1, 1984

[54] METHOD OF PREPARING SILICON FROM SODIUM FLUOSILICATE

[75] Inventors: Frederick A. Schmidt; David Rehbein; Premo Chiotti, all of Ames, Iowa

[73] Assignee: The United States of America as represented by the United States Department of Energy, Washington, D.C.

[21] Appl. No.: 344,084

[22] Filed: Jan. 29, 1982

[51] Int. Cl.$^3$ .................. C01B 33/02; C30B 29/02
[52] U.S. Cl. ........................ 423/350; 156/DIG. 64; 423/341; 423/490
[58] Field of Search ............... 156/613, DIG. 64; 423/349, 350, 341, 348

[56] References Cited

U.S. PATENT DOCUMENTS 3,041,144  6/1962  Schering .
4,124,410  11/1978 Kotval et al. ................. 423/350
4,139,438  2/1979  Fey et al. ..................... 423/350
4,312,850  1/1982  Dietl et al. .................... 423/350

OTHER PUBLICATIONS

Schmidt et al.; "The Preparation of High Purity Silicon Using Thermite Reactions"; IS-4762; 10/1/79–11/10/80.
Sanjurjo et al.; "Silicon by Sodium Reduction of Silicon Tetrafluoride"; J. Electrochem. Soc.; vol. 128; No. 1; pp. 179–183; 7/21/80.
Hartman et al.; "Processing and Purification of Silicon for Semiconductor Use"; Metal Progress; pp. 100–103; Oct. 1956.
Chiotti; "The Pseudobinary System NaF–Na$_2$SiF$_6$"; J. of the Less Common Metals; 80; pp. 105–113; Feb. 1981.
Chiotti; "Dissociation Pressure and Thermodynamic Properties of Na$_2$SiF$_6$"; J. of Less Common Metals; 80; Feb. 1981; pp. 97–104.
Sanjurjo et al.; "Production of Silicon for Solar Cells"; Mat. Res. Bull.; vol. 16; pp. 437–451; Feb. 1981.

Primary Examiner—Bradley Garris
Attorney, Agent, or Firm—Walter L. Rees; James W. Weinberger; Michael F. Esposito

[57] ABSTRACT

A process for preparing high purity silicon metal from Na$_2$SiF$_6$ (sodium fluosilicate). The sodium fluosilicate is heated to decomposition temperature to form NaF, which retains most of the impurities, and gaseous SiF$_4$. The SiF$_4$ is then reduced by the bomb reduction method using a reductant having a low packing density.

10 Claims, No Drawings

METHOD OF PREPARING SILICON FROM SODIUM FLUOSILICATE

CONTRACTUAL ORIGIN OF THE INVENTION

The United States Government has rights in this invention pursuant to Contract No. W-7405-ENG-82 between the U.S. Department of Energy and Ames Laboratory.

BACKGROUND OF THE INVENTION

This invention relates to a method of preparing high purity silicon. More specifically, this invention relates to a method of preparing high purity silicon from $Na_2SiF_6$ (sodium fluosilicate).

The production of large single crystals of silicon, from which single crystal silicon solar cells are manufactured requires large quantities of high purity silicon. The crystals are pulled by the Czochralski method from semiconductor grade silicon, and then cut into wafers of appropriate thickness which are fabricated into solar cells. Semiconductor grade silicon is presently prepared by reducing purified silicon tetrachloride or trichlorosilane with purified hydrogen.

Research is also being conducted into other methods for preparing silicon for solar cells from other forms of silicon which may be less expensive. However, by which ever method the solar cells are prepared, the cost of high purity silicon to produce them is high and may go higher due to accelerated growth in the semiconductor and solar cell industry. Furthermore, the increased demand may bring about a shortage of suitably pure silicon.

One readily available source of silicon is sodium fluosilicate ($Na_2SiF_6$) which is a by-product of the phosphate fertilizer industry. It is estimated that 500,000 metric tons of this material are produced each year. A process which could reduce this compound to high purity silicon suitable for use in the semiconductor industry or for preparing single crystals of silicon would be expected to find wide utilization.

One method which has been developed for the reduction of sodium fluosilicate is the metallothermic or "bomb" reduction. In this method of reduction, the compound to be reduced is mixed with one or more reducing agents and the resulting mixture is ignited. Ideally, the reaction continues spontaneously with complete oxidation of the reducing elements, forming a fluid slag while the reduced metal is obtained as a compact uniform regulus. In order for this technique to be successful, the heat of reaction must be sufficiently large so that under adiabatic conditions both the silicon and slag products are molten with separation of silicon and slag into two separate aggregates.

Compounds which will reduce fluosilicate include any of the alkali, alkaline earth metals, magnesium and aluminum. However, the choice is limited because of costs and other considerations, such as recovery of the metal reductant from the silicon if an alloy is produced. If alloying of the reductant with silicon occurs, either intentionally or unintentionally, the reductant must be sufficiently volatile to be removed by heating the alloy under vacuum at some reasonable temperature, preferably below 1000° C. Thus the most economical, suitable reducing agents are sodium and magnesium.

The use of either sodium or magnesium alone as a reductant for $Na_2SiF_6$ will not supply sufficient heat to melt the reaction product to form a compact regulus so that a thermal booster must be added to generate the extra heat required. Sulfur has been found to be the most suitable booster for use with sodium, however, the reaction requires 3.12 mol of sulfur in addition to 10.20 mol of sodium for every one mol of potential silicon produced making the sodium-sulfur system undesirable and uneconomical. Boosters which have been considered for use with magnesium include Al and $KClO_3$, $KClO_3$ alone and sulfur. However, the combination of magnesium and any of these boosters provided a silicon yield which was no higher than about 66%. Furthermore, the purity of the resulting silicon was not sufficiently high to be used for preparing single crystals due to impurities in the fluosilicate, the magnesium and the booster.

SUMMARY OF THE INVENTION

A process has been developed for the recovery of silicon from sodium fluosilicate which overcomes many of the problems attendant with the hereinbefore described methods. It has been found that by thermally decomposing the sodium fluosilicate to NaF and gaseous $SiF_4$, most of the impurities in the compound remain with the NaF while the gaseous $SiF_4$ is very pure. Furthermore, it has been found possible to safely reduce the gaseous $SiF_4$ by the bomb method and achieve surprisingly high yields of high purity silicon. To the best of our knowledge, gaseous compounds have not been successfully reduced prior to this time by the bomb method. By the process of the invention, sodium fluosilicate is heated to decompose the sodium fluosilicate to NaF and gaseous $SiF_4$, the gaseous $SiF_4$ is then passed into a reduction bomb containing a suitable reductant to form a reaction mixture, the reductant being in a physical form having a high surface area and low packing density, the reaction mixture is then ignited to react the $SiF_4$ and reductant to reduce the $SiF_4$ to silicon and a slag and recovering the silicon.

The process has an additional advantage that the NaF formed during decomposition of the sodium fluosilicate can be readily recovered for recycling thus lowering the cost of the recovered silicon.

It is therefore one object of the invention to provide a process for preparing high purity silicon.

It is another object of the invention to provide a process for preparing high purity silicon from sodium fluosilicate.

Finally, it is the object of the invention to provide a process for preparing high purity silicon from sodium fluosilicate by the bomb reduction process.

DETAILED DESCRIPTION OF THE PREFERRED EMBODIMENT

These and other objects of the invention may be met by heating the sodium fluosilicate to at least 940° C. to decompose the sodium fluosilicate to sodium fluoride and silicon tetrafluoride, whereby most of the impurities in the sodium fluosilicate remain with the sodium fluoride. The purified silicon tetrafluoride is then fed into a reduction bomb containing a reductant of either sodium or magnesium to form a reaction mixture, the reductant being in a physical form having a low packing density which is dispersed throughout the reduction bomb, the amount of reductant being at least a stoichiometric amount. The reaction mixture is then ignited to react the $SiF_4$ with the reductant to reduce the $SiF_4$ to silicon and form a slag. The silicon is then recovered from the slag, or where a magnesium-silicon alloy is formed, the alloy is heated under a vacuum to a temperature sufficient to distill off the magnesium whereby the high-purity silicon metal remains.

Preferably, the sodium fluosilicate is first dried to remove any moisture which it may contain. This is important to prevent any excess pressure build-up in the reduction bomb during the reduction step.

The decomposition of sodium fluosilicate begins at about 400° C. It was found that by heating the compound to at least 940° C. improved yields so that more than 98% of the potential $SiF_4$ was obtained from a charge of the fluosilicate. Complete decomposition of the fluosilicate was found to be dependent upon the pressure in the decomposition vessel, preferably, then, the $SiF_4$ is withdrawn as formed to prevent pressure build-up and to ensure complete decomposition of the fluosilicate.

A number of reducing agents will react with $SiF_4$, such as the alkali metals, the alkaline earth metals, or aluminum. Of these, Mg and Na are preferred because of a reasonable cost and because the reductant must be sufficiently volatile to be removed by heating the alloy under vacuum at a reasonable temperature, preferably below 1000° C.

In order for the thermite reaction to go to completion and, most importantly, to control the reaction so that all of the gaseous $SiF_4$ will react rapidly and prevent a build-up of excess pressure in the bomb due to the presence of hot, gas, it is necessary that the reductant have a low packing density so that it is dispersed throughout the bomb cavity where it is available to react with the $SiF_4$ gas instantly. The packing density for the reductants should range from about 0.1 to 0.3 gm/cc. More specifically, the packing density should range from about 0.1 to 0.2 gm/cc, preferably 0.11 gm/cc for magnesium and 0.2 to 0.3 gm/cc, preferably 0.23 gm/cc for sodium.

The amount of reductant present in the bomb must be an amount sufficient to react stoichiometrically with the $SiF_4$. Preferably the bomb will contain a slight excess of at least 1% and up to 5% reductant. This is necessary to ensure that all of the $SiF_4$ will react to prevent a dangerous build-up of pressure from any unreacted gas in the bomb.

It is preferred that a small amount of a thermal booster be added to reaction mixtures utilizing sodium as the reductant. Generally about 0.55 to 0.65 mols of sulfur per mol of silicon distributed throughout the reaction mixture was found to be satisfactory.

It is important that the reducing agents be as pure as possible in order to prepare silicon having a high degree of purity, since it has been found that impurities in the reductants tend to concentrate in the silicon metal.

The bomb may be of any conventional type known to those skilled in the art. For example, satisfactory results were obtained using steel bombs with graphite or refractory oxide liners and with copper or steel bombs which are either water cooled or which had thick walls of sufficient mass to dissipate the heat.

The reduction reactions may be initiated by external heating such as when a lined steel crucible is used or by an internal, electrically heated filament with the thick wall and water cooled copper and steel crucibles. In the latter instance, a "trigger" consisting of a few grams of magnesium mixed with a few grams of sulfur was provided around the internal ignition wire.

If the $SiF_4$ was reduced with Mg, a reductant-silicon alloy is formed. The silicon is recovered from the alloy by heating the alloy under a vacuum to the vaporization temperature of magnesium which distills off leaving the purified silicon as a sponge. Silicon formed by this reduction with sodium need only be physically separated from the slag.

The silicon sponge is then consolidated and further purified by nonconsummable arc melting into a water-cooled copper mold or by induction heating into a suitable crucible such as quartz. The arc melting process is accomplished by establishing an electric arc between a high density graphite nonconsumable electrode and a high purity silicon strike pad. After achieving a molten pool, silicon sponge is added by a vibrating hopper or other suitable means. Electromagnet coils are placed on the outside of the mold to enable rotation of the arc.

Consolidation and purification of the silicon may also be accomplished by induction heating. A charge of the silicon-magnesium alloy is placed into a suitable crucible such as quartz and slowly heated under a vacuum to about 1250° for three hours to distill off the magnesium. The purified sponge is then heated to about 1425° to further purify and consolidate the silicon.

The following examples are given as illustrative of the process of the invention and are not to be taken as limiting the scope of the invention which is defined by the appended claims.

EXAMPLE I

A $SiF_4$ generation system was built which consisted of a stainless steel retort heated by an electric resistance furnace, an Inconel condensing tank cooled by a liquid nitrogen bath and associated plumbing for gas transfer between the two vessels. A quantity of $Na_2SiF_6$ was decomposed in the hereinbefore described equipment at 940° C. to obtain a yield of $SiF_4$ of about 98% for a $Na_2SiF_6$ charge of 5 to 6 kilograms. Total heating time for a typical generation was about 6 hours.

EXAMPLE II 13.84 mols of $-0.32$ cm mesh magnesium metal having a packing density of 0.84 gm/cc and some magnesium and sulfur as a trigger were placed into a heavy walled copper crucible. This was about 11% deficient in reductant. The crucible was sealed and evacuated to less than 50 microns pressure. 7.81 mols of $SiF_4$ gas was bled into the crucible to a pressure of 620 psig. The exact $SiF_4$ charge was determined by measuring the weight loss of the $SiF_4$ tank. Reduction was initiated by a 220 v power supply connected to a high pressure electrical feedthrough placed in the head of the crucible. The reduction yielded 177 g of a silicon—10.5 w/o magnesium alloy for a silicon yield of 69.1% of the potential silicon available.

EXAMPLE III

Into a small water-cooled copper crucible, 8.9 cm in diameter $\times$ 33 cm deep was placed 11.78 mol of $-0.32$ cm mesh magnesium granules. These granules had a packing density of 0.84 g/cc and formed a column only 5 cm tall. The crucible was sealed and 5.99 mol (760 psig) of $SiF_4$ was added. After reduction, a large amount of free magnesium was found at the bottom of the crucible. In addition, an $SiF_4$ residual pressure of 300 psig was present after ambient temperature was achieved. It was determined that due to the short magnesium column some of the magnesium formed a liquid layer on the bottom of the crucible and because of the high cooling rate, this magnesium had frozen into the MgF$_2$ slag and was thus prevented from reacting with the SiF$_4$.

EXAMPLE IV

Example III was repeated using the same crucible except that a 2.5 cm thick graphite block was placed in the bottom of the crucible to reduce the cooling rate. Also, magnesium chips having a 0.15 g/cc packing density were used to form an extended column of reductant. Upon reduction, the reaction yielded a 173 gram alloy boule containing 21.1 weight percent magnesium. This corresponds to a 94.3% silicon yield.

EXAMPLE V

An additional reduction, identical to Example IV was made except that the crucible was a 13 cm in diameter by 89 cm deep water cooled copper crucible. The charge consisted of 25.39 mol SiF$_4$ and 1153 grams (47.84 mol) magnesium (5.8% deficiency). This reduction yielded 800 gms of alloy. The alloy had not all coalesced into a single boule but was segregated at the top of the slag column; however, separation from the slag was very good. Analysis of the MgF$_2$ slag showed only 875 ppm of silicon present in the slag. The weight loss after the Mg was removed was 26.6% which was taken as the magnesium concentration. This corresponds to a silicon yield of 82.3% of that present in the SiF$_4$ charged.

EXAMPLE VI

In a manner similar to Example V, a charge consisting of 22.9 mol SiF$_4$ and 45.74 mol of double distilled Mg (0.1% deficiency) were placed in the crucible. Upon reduction, 778 gms of alloy were recovered which contained 20.2% magnesium.

EXAMPLE VII

Samples of the silicon recovered in Examples V and VI were analyzed by the induction coupled plasma (ICP) method. The results are given in Table I below. Also given in the Table, for comparison, are the results of ICP analysis of Si prepared by the reduction of Na$_2$SiF$_6$ with magnesium using a sulfur booster and the analysis of a commercial grade high purity magnesium.

TABLE I

|    | Na$_2$SiF$_6$ Reduced with Mg and Sulfur | Example V | Example VI | Magnesium |
|----|------|------|------|------|
| Al | 3800 | 80   | 580  | 31   |
| *B | 2600 | 180  | 2700 | <20  |
| Cr | 12   | <5   | 2    | <4   |
| Cu | 150  | 37   | 48   | <5   |
| Fe | 310  | 820  | 45   | 340  |
| Mn | 9.4  | 26   | 1.7  | 11   |
| Mo | 2.5  | <20  | 12   | <10  |
| Ni | 2.0  | 15   | 14   | 20   |
| *P | 600  | <200 | 190  | —    |
| Ti | 56   | 4    | 2    | 0.6  |
| V  | 39   | 5    | <2   | <4   |

*Considered to be inaccurate.

As can be seen from the Table above, the method of the invention for reducing SiF$_4$ provides greatly improved silicon purities over silicon prepared by the reduction of Na$_2$SiF$_6$. Also shown by the Table is the contribution to impurities in the silicon made by the magnesium and hence the need for ultrapure magnesium in order to prepare silicon having a purity suitable for preparing semi-conductors.

EXAMPLE VIII 28.01 mol of sodium was placed in a heavy walled copper crucible along with a small amount of magnesium as a trigger. The sodium was in the form of very thin ribbons, about 5 cm×12.5 cm having a packing density of about 0.23 gm/cc. Upon sealing, 7.19 mol of SiF$_4$ was then added to the crucible and the reaction initiated. Upon opening, it appeared that only 60–70% of the sodium and SiF$_4$ had reacted. There was a residual SiF$_4$ pressure of 350 psig and considerable free sodium intermixed with the slag. There was a significant amount of silicon present but it was mixed throughout the slag in the form of small platelets. This indicated that additional heat was necessary to complete the reaction and to bring about separation of the silicon from the slag.

EXAMPLE IX

Another reduction using sodium was done in such a manner as to minimize heat loss. A graphite crucible was wrapped with graphite felt insulation and inserted into a stainless steel reduction crucible. A 2.5 cm thick graphite block and two layers of graphite felt were placed under the crucible. An extended column of sodium (19.965 mol, 459 gm) was placed in the graphite crucible and after adding 4.935 mol of SiF$_4$ the reduction was initiated by internal heating. The reduction went to completion. An area of silicon-rich slag was found indicating the product phases had begun to separate. It appeared that retention time in the molten state was insufficient for good gravity separation to take place.

EXAMPLE X

A large scale reduction using a water-cooled stainless steel crucible 14.3 cm diameter by 92 cm deep was performed using 108.20 mol (2487 gm) of Na and 27.05 mol of SiF$_4$. This reduction also contained a thermal booster of 30.88 mol (710 gm) Na and 15.41 mol (464 gm) S to enhance separation time by raising the final reaction temperature. Approximately 525 gm of silicon was recovered from this reduction for a silicon yield of 69%. The silicon recovered was then consolidated or further purified by melting it in a quartz crucible by induction heating. A sample of this silicon was then analyzed by the ICP method and the results are given in Table II below. Also given in the Table are the results of an analysis of a sample of magnesium reduced SiF$_4$ silicon which was induction melted in a quartz container and of semi-conductor grade silicon prepared from silane.

TABLE II

|    | Silicon Prepared by Na-Reduction of SiF$_4$ and induction Melted in Quartz ppmw | Silicon Prepared by Mg Reduction of SiF$_4$ and induction Melted in Quartz ppmw | Silicon Prepared by Reduction of Silane ppmw |
|----|------|------|------|
| Al | 11   | 104  | 39   |
| B  | —    | —    | 19   |
| Cr | 15   | 7.1  | .37  |
| Cu | 6    | 16   | 34   |
| Fe | 280  | 300  | 93   |
| Mn | 5    | 3.3  | 1.2  |
| Mo | <2   | <2   | <0.78|
| Ni | 8    | 5.4  | 0.26 |
| P  | —    | —    | 13   |

TABLE II-continued

| | Silicon Prepared by Na-Reduction of SiF4 and induction Melted in Quartz ppmw | Silicon Prepared by Mg Reduction of SiF4 and induction Melted in Quartz ppmw | Silicon Prepared by Reduction of Silane ppmw |
|---|---|---|---|
| Ti | 3 | 7.1 | 27 |
| V | 1 | 3.8 | <26 |

Thus, the silicon prepared by sodium reduction compares very favorably in purity with high purity silicon prepared from silane, while silicon from magnesium reduction is only limited in purity by the magnesium used for the reduction.

As can be seen from the above description and Examples, the method of the invention provides an economical and effective method of obtaining high purity silicon from a readily available and inexpensive material.

The embodiments of this invention in which an exclusive property or privilege is claimed are defined as follows:

1. A process for preparing high purity silicon from $Na_2SiF_6$ comprising:
   heating the $Na_2SiF_6$ to decomposition temperature to form NaF and gaseous $SiF_4$, whereby most impurities remain with the NaF,
   feeding the gaseous $SiF_4$ into the cavity of a reduction bomb containing a suitable reductant to form a reaction mixture, the reductant being in a physical form having a packing density from about 0.1 gm/cc to about 0.3 gm/cc, and being dispersed throughout the bomb cavity,
   igniting the reaction mixture to react the $SiF_4$ with the reductant to form silicon and a slag, and recovering the silicon.

2. The process of claim 1 wherein the reductant is selected from the group consisting of the alkali metals, the alkaline earth metals, and aluminum.

3. The process of claim 2 wherein the $Na_2SiF_6$ is first dried before it is heated to decomposition temperature.

4. The process of claim 3 wherein the reductant is selected from the group consisting of sodium and magnesium.

5. The process of claim 4 wherein the reductant is sodium, the packing density is from about 0.2 to 0.3 gm/cc and the reduced silicon is formed separate from the slag.

6. The process of claim 5 wherein the reaction mixture also contains from 0.55 to 0.65 mol sulfur per mol silicon as a thermal booster.

7. The process of claim 5 including the additional step of placing the silicon into a quartz crucible and heating the silicon in a vacuum by induction heating to about 1425° C. to remove additional impurities and consolidate the silicon.

8. The process of claim 4 wherein the reductant is magnesium, the packing density is from about 0.1 to 0.2 gm/cc and a silicon-magnesium alloy is formed.

9. The process of claim 8 wherein the silicon is recovered by heating the silicon-magnesium alloy to about 1000° C. under a vacuum to distill off the magnesium, whereby the high purity silicon remains.

10. The process of claim 8 wherein the silicon-magnesium alloy is placed in quartz crucible and heated under a vacuum by induction heating to about 1000° to 1250° C. to distill off the magnesium, forming a high purity silicon sponge and further heating the sponge to about 1425° C. to further purify and consolidate the silicon.

* * * * *